United States Patent [19]

Gabano et al.

[11] 4,158,723
[45] Jun. 19, 1979

[54] HIGH SPECIFIC ENERGY BATTERY

[75] Inventors: Jean-Paul Gabano; Michel Broussely, both of Poitiers, France

[73] Assignee: Saft-Societe des Accumulateurs Fixes et de Traction, Romainville, France

[21] Appl. No.: 942,291

[22] Filed: Sep. 14, 1978

[30] Foreign Application Priority Data

Oct. 14, 1977 [FR] France ............................... 77 30946

[51] Int. Cl.$^2$ .............................................. H01M 6/16
[52] U.S. Cl. ..................................... 429/197; 429/228
[58] Field of Search ................ 429/194, 225, 228, 197

[56] References Cited

U.S. PATENT DOCUMENTS

| | | | |
|---|---|---|---|
| 3,736,184 | 5/1973 | Dey et al. ............................ | 429/194 |
| 3,853,627 | 12/1974 | Lehmann et al. ..................... | 429/194 |
| 4,018,970 | 4/1977 | Jumel et al. ......................... | 429/194 |

FOREIGN PATENT DOCUMENTS 2516704  10/1976  Fed. Rep. of Germany ........... 429/194

Primary Examiner—Donald L. Walton
Attorney, Agent, or Firm—Kenyon & Kenyon

[57] ABSTRACT

A high specific energy electric cell having a lithium negative active material, an electrolyte solution of which the solvent is an aprotic liquid, and the positive active material is a derivative of divalent lead oxide, PbO. The lead oxide derivation is a compound of said PbO and an oxide selected from the group comprising the oxides of bismuth, $Bi_2O_3$, antimony, $Sb_2O_3$, and tin, $SnO_2$.

7 Claims, 2 Drawing Figures

HIGH SPECIFIC ENERGY BATTERY

BACKGROUND OF THE INVENTION

I. Field of the Invention

The present invention relates to high specific energy batteries having lithium as the negative active material and including an electrolyte in which the solvent is an aprotic composition. The invention relates particularly to a positive active material for such batteries.

II. Description of the Prior Art

U.S. Pat. No. 4,018,970, issued to Y. Jumel on Apr. 19, 1977 and assigned to the assignee of the present application, describes lithium batteries of which the positive active material comprises, among others, the oxide of lead known as minium (or red lead) and having the formula $Pb_3O_4$.

SUMMARY OF THE INVENTION

In the course of their research, the present inventors have discovered that certain compositions, analogous to minium, which result from the combination of an oxide having the character of an acidic anhydride with the oxide of lead, PbO, which itself has a basic character, give results at least equal to those of minium when they are used as positive active materials in lithium batteries.

The present invention thus has for its object an electric cell of which the negative active material is lithium, the electrolyte is a solution in which the solvent is an aprotic liquid, and the positive active material is a derivative of the divalent oxide of lead, PbO, wherein said derivative is a combination of said divalent lead oxide with an oxide chosen from the group of oxides of bismuth, $Bi_2O_3$, antimony $Sb_2O_3$, and tin, $SnO_2$.

The bismuthate of lead having a formula $Pb_2Bi_2O_5$, among others, has given excellent results. This positive active material possesses the following physical advantages:

(a) Its powder molds perfectly to form agglomerated electrodes, making it unnecessary to add a binder, as is required in the case of minium;

(b) It is much less soluble in propylene carbonate, among other solvents, and this permits the use of this electrolyte solvent for batteries which must be stored for a long time.

Electrolytes which can be used in batteries according to the invention are those solutions in which the solvent can be an ether or an ester of mixtures of ethers and esters. Among suitable ethers are dioxolane, tetrahydrofuran, dimethoxyethane, or their mixtures. Among suitable esters are dimethylsulfite, propylene carbonate, ethylene carbonate, and their mixtures.

The solute in such a battery is preferably a lithium salt, such as lithium perchlorate, lithium tetrafluoborate, lithium fluoromethylsulfonate, or lithium hexafluoroarsenate.

The invention can be better understood with the aid of the following examples, illustrated by the attached drawing.

DESCRIPTION OF THE PREFERRED EMBODIMENT

Figure 1:
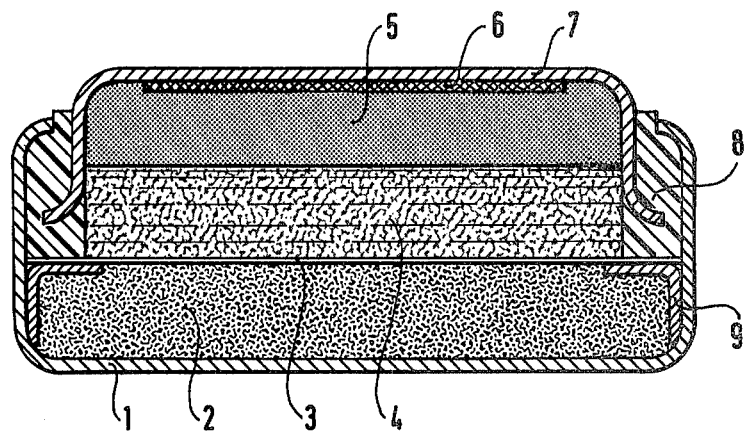
FIG. 1 is a cross-section of a button-type battery structure useful for the practice of the invention.

Referring to FIG. 1, conventional button-type batteries are constructed having an exterior diameter of 11.6 mm. and an overall height of 11.4 mm. The battery casing is assembled from two cups, 1 and 7, of nickel steel or stainless steel, separated by a seal 8 of plastic or elastomeric material which serves both to seal and to insulate the cups electrically from each other. Negative cup 7 contains lithium in the form of a foil or film 5 deposited on a collector grill or screen 6 of nickel steel or stainless steel that is soldered or otherwise electrically bonded to the cup. The positive cup 1 contains powdered active material 2 which is augmented by an electronic conductor and, eventually, by a binder. This active mass is compressed into the cup 1 which may be equipped, as shown, with an annular metal ring 9 (made of nickel steel or stainless steel) which serves to contain the active material and also to reinforcingly support the seal 8, over which is crimped the lip of cup 1.

The positive and negative materials are separated by a paper-barrier 3 and by layers of cellulose 4 saturated with an electrolyte.

To demonstrate the advantages of the present invention, two series of test cells were constructed, the first series being made according to the prior art and the second series according to the present invention, as follows:

A first series of batteries was assembled on the model described above. The positive active mass was composed of powdered minium ($Pb_3O_4$), to which was added powdered lead and polytetrafluorethylene, in the respective weight proportions of 73%, 23% and 4%. The mixed ingredients of this mass were then compressed into the positive cup under a pressure of 1.5 tons/cm$^2$, the amount used providing a thickness of height of 1.35 mm for the cathode mass 2. The theoretical capacity of this mass was 148 mAh. The electrolyte for this first series of cells was composed of a 2 molar solution of lithium perchlorate in dioxolane. As indicated earlier, the batteries of this first series represented the technique of the prior art.

Figure 2:
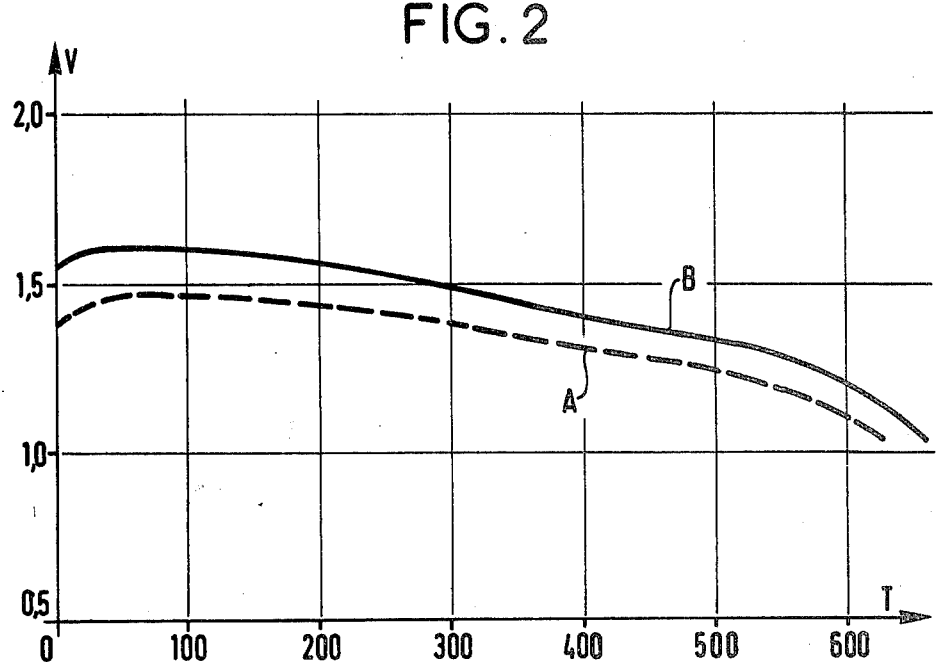
FIG. 2 is a graph showing the discharge curves of two batteries, one battery according to the prior art and the other battery according to the invention.

Each battery of the first series was discharged through a resistance of 5,000 ohms. With reference to FIG. 2, curve A shows the discharge curve of these batteries, with the ordinate being calibrated in volts V and the abscissa being calibrated in hours of discharge time T. Taking 1.2 volts as the final discharge voltage, the discharge time is about 550 hours, which correspond to an effective capacity of 1.45 mAh. It should be noted that, at discharge, for voltages from 1.3 to 1.2, it is quite probable that the polytetrafluorethylene participates in the discharge and, as a consequence, the output is attributable to the mixture of minium and polytetrafluorethylene.

Next, a second series of batteries similar to the first series was prepared, but having a positive active material according to the present invention. That active material was composed of bismuthate of lead, $Pb_2Bi_2O_5$. To this was added powdered lead, as an electronic conductor, but the addition of a binder was rendered unnecessary by the compressible quality of the lead bismuthate powder. As a result, this active mass is more conductive than the prior art mixture of minium and polytetrafluorethylene, and the quantity of powdered lead can be decreased by about 10%. The active mass according to the present invention used in the second series of cells was, therefore, about 90% lead bismuthate and about 10% metallic lead, by weight. The compression of the active mass into the negative cup was carried out at 1 ton per cm$^2$, enough material being used to obtain a height of the compressed mass of 1.35 mm, as in the first series of cells. The theoretical capacity of this mass was 198 mAh.

With reference to FIG. 2, curve B shows the discharge of the batteries of this second series, also through a resistance of 5,000 ohms. As can be seen, although the exterior dimensions of this second series of cells are equal to the dimensions of the first series, the second series cells, using a positive active material according to the invention, discharged at a higher voltage (1.45 volts average, as against 1.37 average volts for the first series). Their discharge lasted for 600 hours, which corresponds to a capacity of 175 mAh.

It will be appreciated that the invention is not limited to the embodiment described and shown, which is given only by way of example.

We claim:

1. An electric cell having lithium as a negative active material, an electrolyte solution of which the solvent is a aprotic liquid, and a positive active material derived from divalent lead oxide, PbO, wherein the improvement comprises: said derivative being a compound of PbO and an oxide selected from the group consisting of the oxides of bismuth, $Bi_2O_3$, antimony, $Sb_2O_3$, and tin $SnO_2$.

2. An electric cell according to claim 1 wherein the positive active material comprises lead bismuthate, $Pb_2Bi_2O_5$.

3. An electric cell according to claim 1 or 2 wherein the positive active material further comprises an electronic conductor.

4. An electric cell according to claim 3 wherein said electronic conductor is powdered lead.

5. An electric cell according to claim 1 or 2 wherein the solvent of said electrolyte is selected from the group comprising dioxolane, tetrahydrofuran, dimethoxyethane, dimethyl sulfite, propylene carbonate, ethylene carbonate, and their mixtures.

6. An electric cell according to claim 1 or 2 wherein the solute of said electrolyte solution is a lithium salt selected from the group comprising lithium perchlorate, lithium tetrafluoborate, lithium fluoromethylsulfonate, and lithium hexafluoroarsenate.

7. An electric cell according to claim 1 or 2 wherein the electrolyte is a 2 molar solution of lithium perchlorate in dioxolane.

* * * * *